(12) United States Patent
Kadowaki

(10) Patent No.: US 10,626,535 B2
(45) Date of Patent: Apr. 21, 2020

(54) SEWING MACHINE AND SEWING SYSTEM

(71) Applicant: JUKI CORPORATION, Tokyo (JP)

(72) Inventor: Shinjirou Kadowaki, Tokyo (JP)

(73) Assignee: JUKI CORPORATION, Tokyo (JP)

( * ) Notice: Subject to any disclaimer, the term of this patent is extended or adjusted under 35 U.S.C. 154(b) by 327 days.

(21) Appl. No.: 15/676,186

(22) Filed: Aug. 14, 2017

(65) Prior Publication Data
US 2018/0044830 A1 Feb. 15, 2018

(30) Foreign Application Priority Data

Aug. 15, 2016 (JP) ................................. 2016-159071

(51) Int. Cl.
*D05B 57/30* (2006.01)
*D05B 69/00* (2006.01)

(52) U.S. Cl.
CPC ............. *D05B 57/30* (2013.01); *D05B 69/00* (2013.01)

(58) Field of Classification Search
CPC .. D05B 57/30–36; D05B 69/02; D05B 69/04; D05B 73/00; D05B 75/00
USPC ......................................... 112/220, 221, 284
See application file for complete search history.

(56) References Cited

U.S. PATENT DOCUMENTS

| | | | | |
|---|---|---|---|---|
| 1,160,986 A * | 11/1915 | Kiewicz | .................... | F16H 7/14 474/89 |
| 2,205,176 A * | 6/1940 | Sauer | .................. | D05B 69/125 474/115 |
| 2,758,558 A * | 8/1956 | Waterman | .............. | D05B 69/12 112/279 |
| 3,563,196 A * | 2/1971 | Nicolay | ................. | D05B 69/12 112/220 |
| 4,553,489 A * | 11/1985 | Landwehr | .............. | D05B 21/00 112/220 |
| 4,905,615 A * | 3/1990 | Pofferi | ..................... | B68G 7/10 112/2.1 |
| 5,095,834 A * | 3/1992 | Braun | .................... | D05B 19/00 112/221 |
| 5,381,743 A * | 1/1995 | Moll | ..................... | D05B 23/00 112/2.1 |
| 5,875,726 A * | 3/1999 | Keilmann | .............. | B25J 9/0084 112/470.13 |
| 5,964,171 A * | 10/1999 | Ciucani | .................. | D05B 15/04 112/475.08 |

(Continued)

FOREIGN PATENT DOCUMENTS

JP H05-305193 A 11/1993

*Primary Examiner* — Danny Worrell
(74) *Attorney, Agent, or Firm* — Faegre Drinker Biddle & Reath LLP

(57) ABSTRACT

A sewing machine in which a base configured to support a throat plate, a shuttle or a looper, and an input shaft for a stitching operation to the shuttle or the looper with respect to a bed portion of a frame is supported to be movable along a direction of approaching or separating from a sewing needle is provided. The sewing machine includes a connecting member which changes to any one of a state in which the input shaft and a transmission shaft are aligned in the same straight line to be in a torque transmission state and a state in which the input shaft moves together with the base with respect to the transmission shaft, between the input shaft on the base side and the transmission shaft which transmits power to the input shaft.

6 Claims, 14 Drawing Sheets

(56) References Cited

U.S. PATENT DOCUMENTS

| | | | |
|---|---|---|---|
| 7,363,869 B1 * | 4/2008 | Yang | D05B 15/00 112/62 |
| 7,565,872 B2 * | 7/2009 | Rippert | D05B 55/06 112/165 |
| 10,240,271 B2 * | 3/2019 | Freer | B25J 11/00 |

* cited by examiner

SEWING MACHINE AND SEWING SYSTEM

CROSS-REFERENCE TO RELATED APPLICATION

The present application claims the benefit of priority in Japanese Patent Applications No. 2016-159071, filed on Aug. 15, 2016, the disclosure of which is incorporated herein by reference.

TECHNICAL FIELD

The present invention relates to a sewing machine suitable for being mounted on a robot arm and a sewing system including the sewing machine.

BACKGROUND ART

A sewing system has been conventionally developed in which a sewing machine is mounted on a tip portion of a robot arm and stitching is performed not only on a flat surface but also on a curved surface having a three-dimensional shape.

In such a sewing system, when a three-dimensionally shaped workpiece is set between the throat plate and the lower end portion of the sewing needle at the start of sewing, it was necessary to open the space between the throat plate and the lower end portion of the sewing needle to be wider than the case of a planar workpiece.

However, even if the sewing needle is lifted to the top dead center position to the maximum extent, the distance between the throat plate and the lower end portion of the needle is insufficient, and a structure for enlarging the distance therebetween is separately required.

Thus, it has been studied to apply a sewing machine having a mechanism for allowing the end portion on the surface portion side of an arm portion to move up and down together with the needle bar with respect to the needle plate to the robot arm (for example, see Japanese Patent Application Laid-open Publication No. 05-305193).

However, in the above-mentioned sewing machine, since the surface side end portion of the arm portion performs lifting and lowering a frame, when the sewing machine is to be mounted on the robot arm, the position of the robot arm for holding the frame needs to be located at a position spaced apart from the surface side end portion to avoid the movable portion of the arm portion. Thus the distance from the tip portion of the robot arm to the stitch point position of the sewing machine was too long, and it was difficult to increase the positioning accuracy of the stitch point position using the robot arm.

SUMMARY OF THE INVENTION

The present invention aims at improving the positioning accuracy of the stitch point position and has any one of the following features (1) to (7).

(1) A sewing machine in which a base configured to support a throat plate, a shuttle or a looper, and an input shaft for a stitching operation to the shuttle or the looper is supported with respect to a bed portion of a frame to be movable along a direction of approaching or separating from a sewing needle, the sewing machine including a connecting member including a first joint member provided on the input shaft on the base side and a second joint member provided on a transmission shaft which transmits power to the first joint member, wherein in the connecting member, in a state where the input shaft and the transmission shaft are aligned on the same line, torque is transmitted between the first joint member and the second joint member, and the first joint member and the second joint member relatively move to each other along the movable direction of the base.

(2) In the sewing machine described in (1) above, the input shaft and the transmission shaft are disposed along the direction orthogonal to the moving direction of the base, the connecting member is connected by a key formed on any one of surfaces of the first joint member and the second joint member facing each other, and a key groove formed on the other surface thereof, and the key and the key groove are formed along a direction orthogonal to the input shaft and the transmission shaft.

(3) In the sewing machine described in (1) above, the connecting member is an Oldham's coupling or a Schmidt coupling.

(4) The sewing machine described in one of (1) to (3) above, further including a lifting and lowering mechanism which moves the base along a direction of approaching and separating from the sewing needle, wherein the lifting and lowering mechanism includes:

a cam follower, a cam main section formed with a cam section which relatively moves the cam follower in a moving direction of the base, and a driving source which causes the cam main section or the cam follower to reciprocate in a predetermined direction intersecting with the moving direction of the base.

(5) In the sewing machine described in (4) above, the cam section of the cam main section has a changing section which causes displacement in the moving direction of the base along with the reciprocating movement of the cam main section or the cam follower by the driving source, and a non-changing section is provided at one end of the changing section so as not to cause displacement in a direction in which the base is spaced apart at a position where the base has most moved to the sewing needle side.

(6) A sewing system including:

the sewing machine in any one of (1) to (5); and a robot arm which holds the sewing machine at the tip portion of the arm.

(7) In the sewing system described in (6) above, a needle bar side end portion of an arm portion of the sewing machine is supported by the robot arm.

According to the present invention, since the member which changes to any one of a state in which torque is transmittable on the same line where the input shaft and the transmission shaft are disposed, and a state in which the input shaft moves together with the base with respect to the transmission shaft is provided between the input shaft on the base side and the transmission shaft which transmits the power to the input shaft, the base can descend to open the space between the sewing needle and the needle plate.

Therefore, without setting a movable structure on the side of the arm portion, the throat plate can descend to open the space between the sewing needle and the throat plate to facilitate the setting of the workpiece. In the case of supporting the sewing machine on the robot arm, the support position can be brought close to the needle bar side end portion of the arm portion. Therefore, the stitch point position of the sewing machine can be brought close to the tip portion of the arm portion, and the positional accuracy of the stitch point position can be improved.

DETAILED DESCRIPTION

[Overall Configuration of Sewing System]

Figure 1:
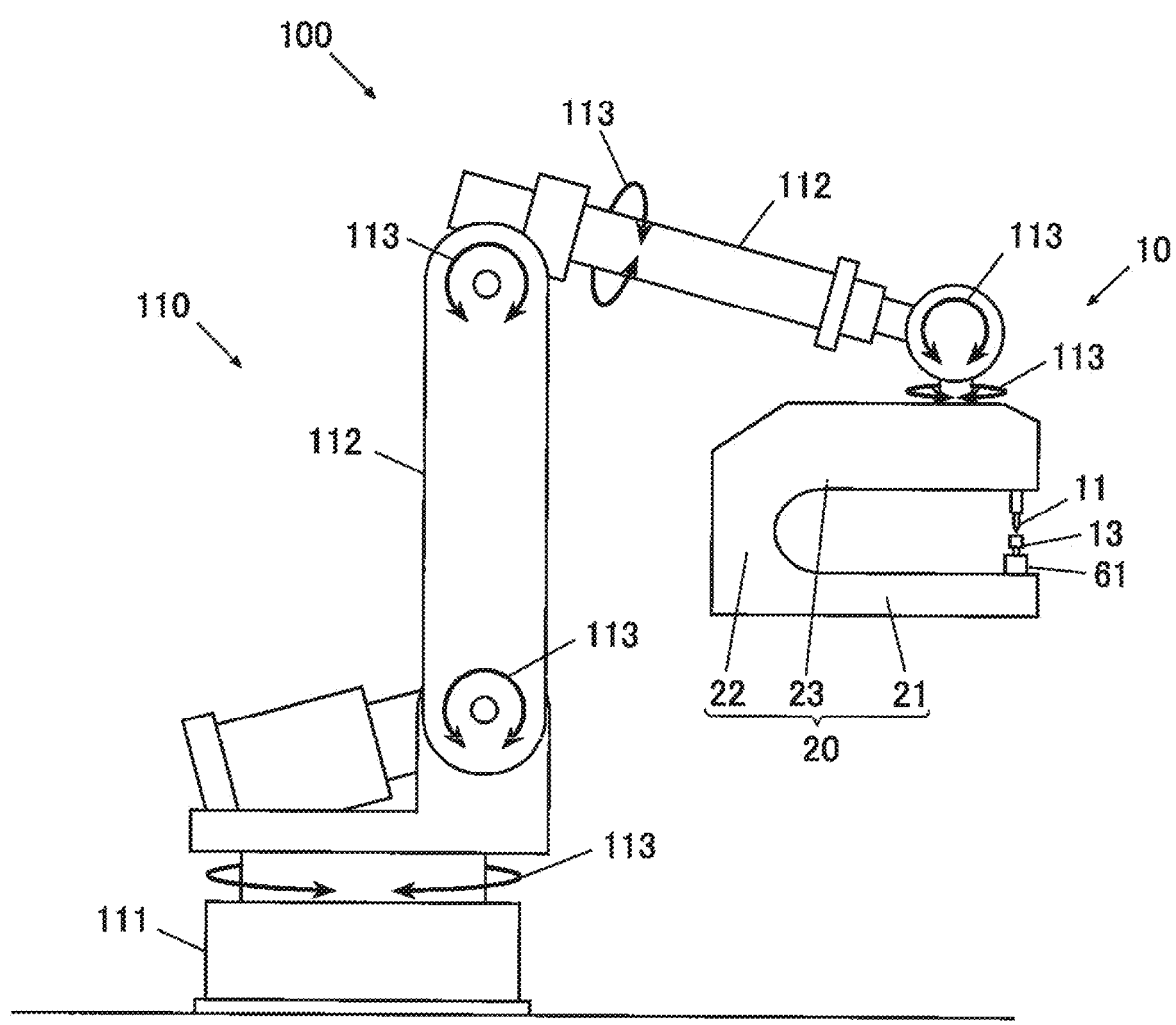
FIG. 1 is a side view of a sewing system.

Hereinafter, a sewing system 100 according to an embodiment of the present invention will be described with reference to the drawings. FIG. 1 is a side view illustrating the overall configuration of the sewing system 100.

The sewing system 100 includes a sewing machine 10 which sews a workpiece, and a robot arm 110 which holds the sewing machine 10 and positions the sewing machine 10 with respect to the workpiece so as to perform arbitrary sewing.

[Robot Arm]

The robot arm 110 is a vertical articulated robot arm which includes a base 111 serving as a foundation, a plurality of arms 112 connected by joints 113, a servo motor as a drive source provided on each joint, and an encoder for detecting the arm angles rotated or pivoted by the servomotors, respectively. The sewing machine 10 is held at the tip portions of a plurality of arms 112 connected by the joints 113.

Each of the joints 113 is constituted by either a swinging joint that swingably supports one end portion of the arm and axially supports the other end portion, or a rotation joint that pivotally supports the arm itself rotatably about its longitudinal direction.

The robot arm 110 has six joints 113, and the sewing machine 10 at the tip portion of the robot arm 110 can be positioned at an arbitrary position by six axes, and can take an arbitrary posture.

Therefore, the robot arm 110 can perform sewing along an arbitrary curve on a three-dimensional curved surface of the workpiece.

The robot arm 110 is not limited to six axes type, but may adopt seven axes type having seven joints. In that case, since a redundant joint is generated, it is possible to move the intermediate joint, while positioning the sewing machine 10 at an arbitrary position and taking the arbitrary posture. Thus, it is possible to avoid interference with other configurations around the robot arm 110. Therefore, the sewing machine 10 can be positioned at an arbitrary position in a wider range and can take an arbitrary posture.

In addition, the tip portion of the arm of the robot aim 110 is held above a tip portion (needle bar side end portion) of an arm portion 23 of a frame 20 of the sewing machine 10. Thus, it is possible to reduce the distance between the vicinity of the stitch point position of the sewing machine 10 and the tip portion of the arm of the robot arm 110 and more accurately position the stitch point position.

[Sewing Machine]

Figure 2:
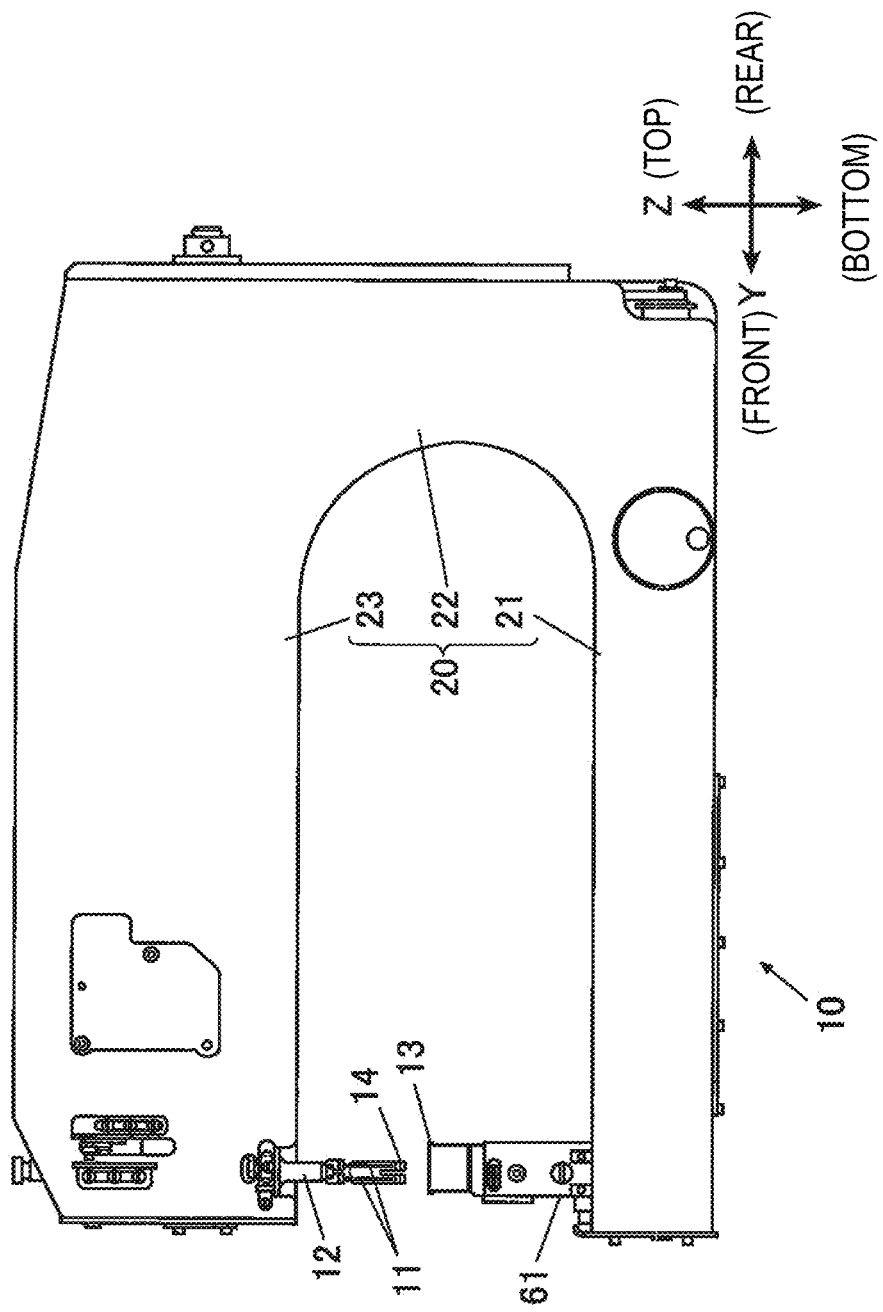
FIG. 2 is a side view of a sewing machine in a state in which a throat plate is located at an upper position.
Figure 3:
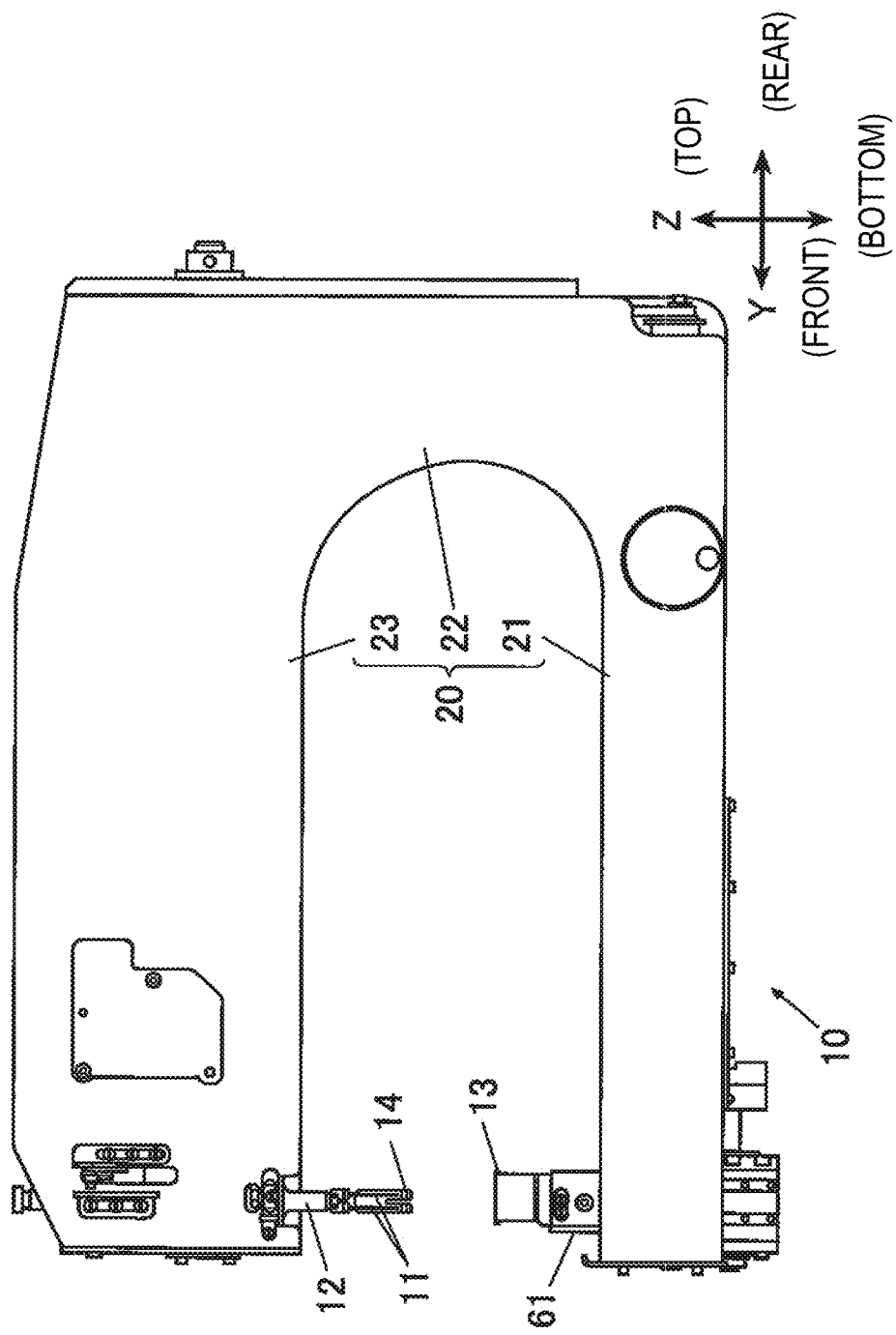
FIG. 3 is a side view of the sewing machine in a state in which the throat plate is located at a lower position.
Figure 4:
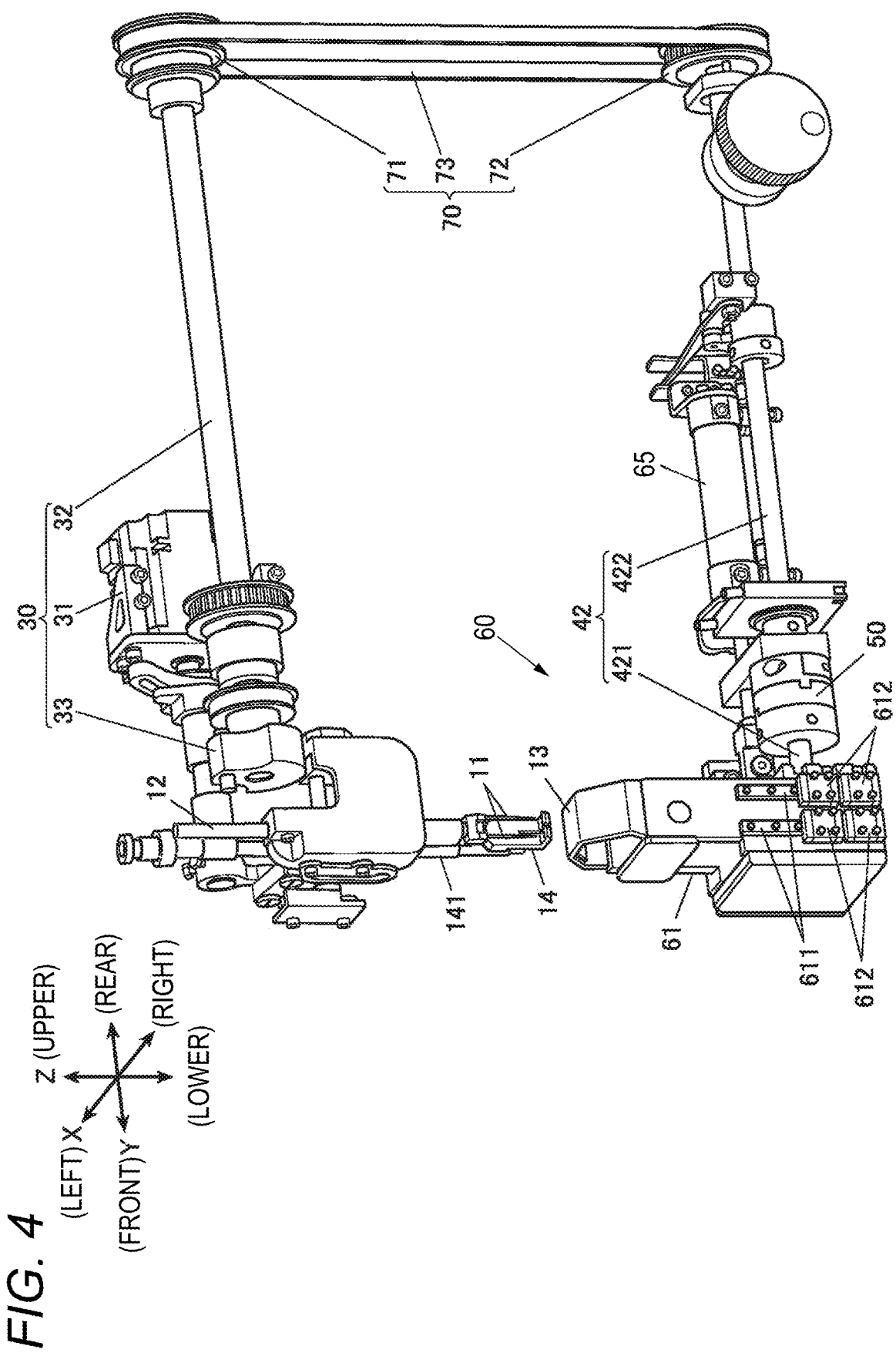
FIG. 4 is a perspective view of the internal configuration of the sewing machine.

FIGS. 2 and 3 are side views of the sewing machine 10, and FIG. 4 is a perspective view illustrating the internal structure of the frame 20. As illustrated in the drawings, in the sewing machine 10, a throat plate 13 and a base 61 for supporting the throat plate 13 are supported to be movable upward and downward with respect to a bed portion 21 of the frame 20, sewing is performed at the lifted position of the needle plate 13 and the base 61 illustrated in FIG. 2, and preparation work for sewing such as setting of the workpiece at the descent position illustrated in FIG. 3.

The sewing machine 10 includes a needle bar 12 for holding two sewing needles 11 at the lower end portion, a needle bar vertical moving mechanism 30 which gives upper and lower reciprocating movement to the needle bar 12, a looper mechanism 40 which inserts the looper thread into the upper thread passing through the sewing needle 11 by the looper 41, a transmission mechanism 70 which transmits the torque of a sewing machine motor 31 which is a driving source of the needle bar vertical moving mechanism 30 to the looper mechanism 40, a lifting and lowering mechanism 60 which lifts and lowers the base 61 that holds a part of the configuration of the needle plate 13 and the looper mechanism 40, a presser foot 14 which presses the workpiece from above with respect to the throat plate 13 at the lifted position, and the frame 20 which supports each of the aforementioned configurations.

[Frame]

The frame 20 includes the bed portion 21 extending in a predetermined longitudinal direction, a standing body portion 22 erected from one end portion of the bed portion 21 in a direction orthogonal to the longitudinal direction, and the arm portion 23 extending from the top of the standing body portion 22 in the same direction as the bed portion 21.

In the following description of each configuration of the sewing machine 10, the longitudinal direction of the bed portion 21 is set to a Y-axis direction, and the direction orthogonal to the Y-axis direction and in which the standing body portion 22 is erected is set to a Z-axis direction, and a direction orthogonal to the Y-axis direction the Z-axis direction is set to an X-axis direction.

Also, one side in the Y-axis direction is set to a front, and the other side is set to a back side. One side in the X-axis direction is set to a left side, the other side is set to a right side. One side in the Z-axis direction is set to an upper side, and the other side is set to a lower side.

[Needle Bar Vertical Moving Mechanism]

The needle bar vertical moving mechanism 30 includes a sewing machine motor 31 serving as a drive source for vertical movement of the needle bar, an upper shaft 32 rotatably driven by the sewing machine motor 31, a needle bar crank 33 fixed to a front end portion of the upper shaft 32, and a crank rod (not illustrated) which connects the needle bar crank 33 and the needle bar 12. That is, the needle bar vertical moving mechanism 30 constitutes a crank mechanism, converts the entire rotation of the upper shaft 32 into upper and lower reciprocating movement, and applies the reciprocating movement to the needle bar 12.

The upper shaft 32 is rotatably supported in the arm portion 23 along the Y-axis direction.

The sewing machine motor 31 is disposed in the vicinity of the front end portion of the upper shaft 32 on the left side thereof with its output shaft oriented in the Y-axis direction. Torque is transmitted between the output shaft of the sewing machine motor 31 and the upper shaft 32 by a gear mechanism (not illustrated).

[Presser Foot]

Figure 5:
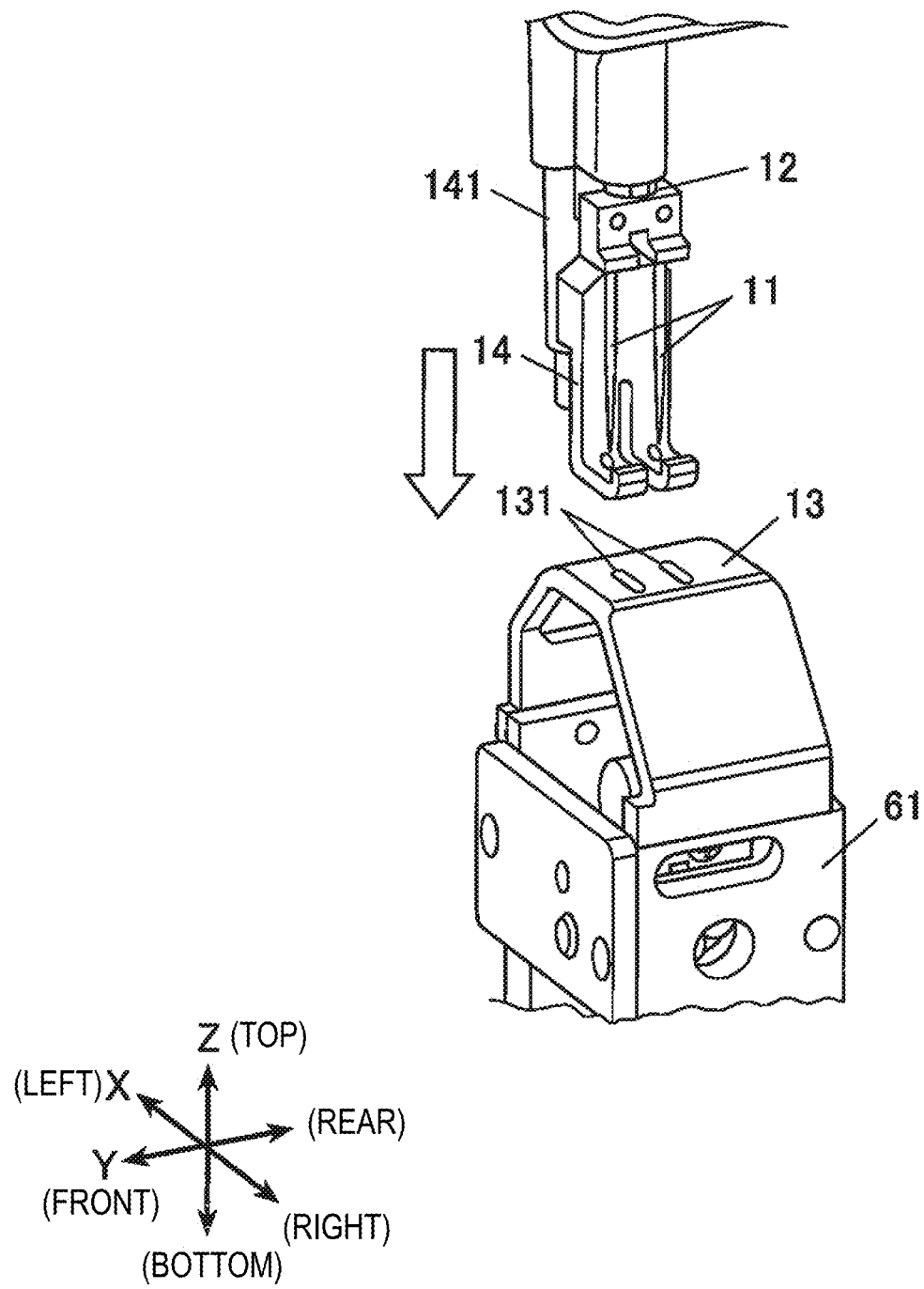
FIG. 5 is a perspective view of a structure around the throat plate.

As illustrated in FIG. 5, the presser foot 14 is held at the lower end portion of the presser bar 141 along the Z-axis direction located on the left side of the needle bar 12, and a downward pressing force is applied thereto by a presser spring (not illustrated) via the presser bar 141.

A presser lifting mechanism (not illustrated) is attached to the presser foot 14 so that the presser foot 14 can be held at a retracted position, which is higher than the presser foot 14 during sewing. The presser lifting mechanism may be a mechanism which is performed by a manual operation, but it is desirable that the presser lifting mechanism can be switched between the retracted position and the sewing position in accordance with the control signal by the actuator.

[Transmission Mechanism]

The looper mechanism 40 has a lower shaft 42 to which torque is input from the upper shaft 32 in order to apply power to the looper 41. The transmission mechanism 70 transmits torque from the above-described upper shaft 32 to the lower shaft 42.

The transmission mechanism 70 includes a main driving pulley 71 fixedly provided on the rear end portion of the upper shaft 32, a driven pulley 72 fixedly provided on the rear end portion of the lower shaft 42, and a timing belt 73 bridged between the main driving pulley 71 and the driven pulley 72.

The outer diameter of the main driving pulley 71 is equal to the outer diameter of the driven pulley 72, and the transmission mechanism 70 transmits rotation from the upper shaft 32 to the lower shaft 42 at a constant speed.

[Looper Mechanism]

Figure 6:
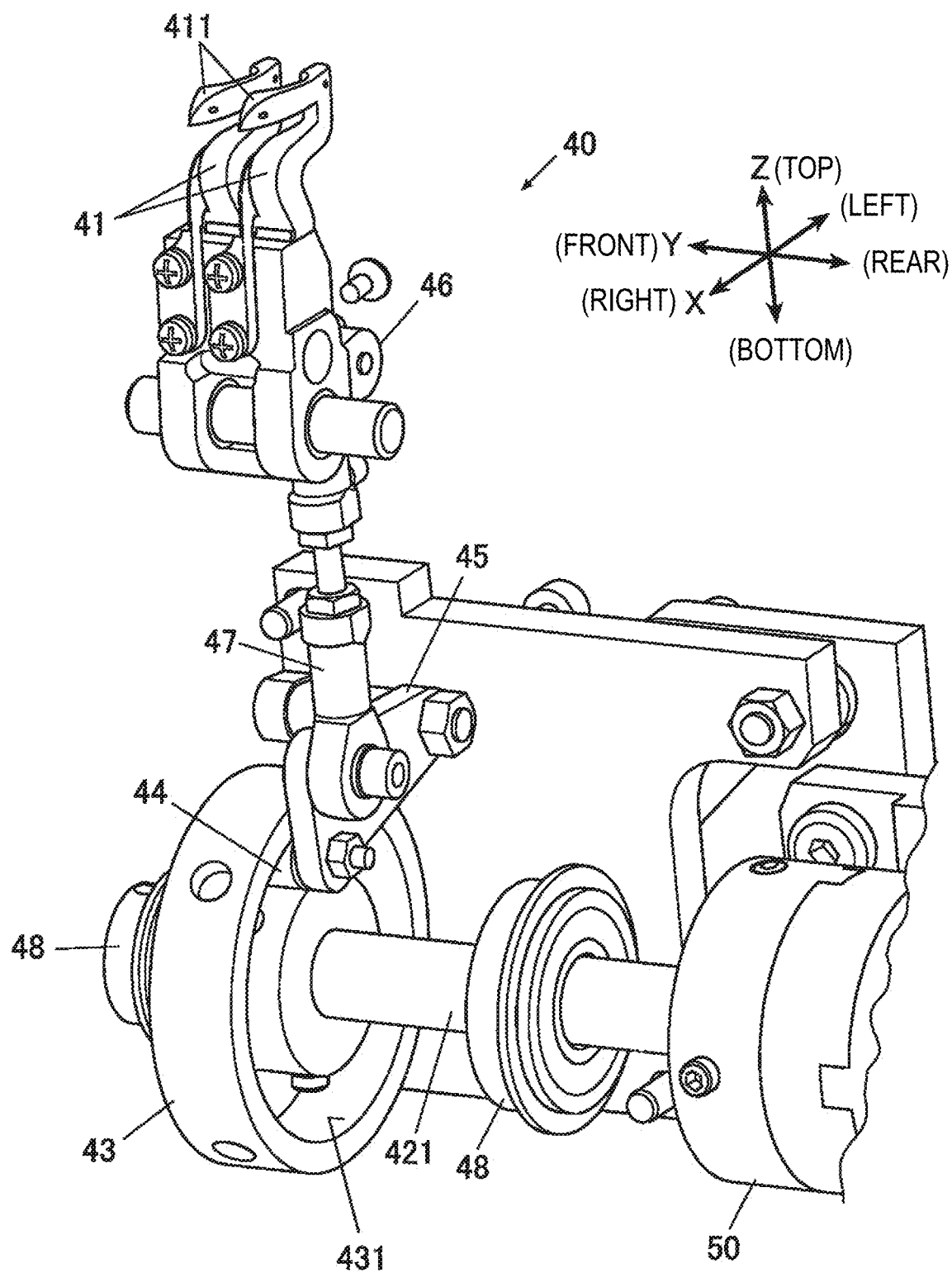
FIG. 6 is a perspective view of a looper mechanism.

FIG. 6 is a perspective view illustrating the configuration around the looper 41 by omitting the base 61 for supporting the looper 41.

As illustrated in FIGS. 4 and 6, the looper mechanism 40 includes two loopers 41, the lower shaft 42 to which torque from the sewing machine motor 31 is transmitted, a groove cam 43 which gives a reciprocating swing movement to each looper 41, a roller 44 as a cam follower, a roller arm 45 which holds the roller 44, and a looper driving rod 47 which connects the roller arm 45 and a input arm 46 provided on the looper 41.

In a state in which the two loopers 41 are arranged in the Y-axis direction, a sharp tip portion 411 is oriented to the right and disposed on the lower side of the throat plate 13. The lower part of each looper 41 is supported so as to be swingable about the Y-axis by a base 61, and thus, the tip portion 411 can reciprocate along the X-axis direction.

An insertion hole through which the looper thread is inserted is formed at the end portion 411 of the looper 41. By bringing the tip portion 411 into a loop of the needle thread formed on the sewing needle 11 on the lower side of the needle plate 13, the loop of the upper thread is captured and the looper thread is inserted. Thereafter, as the looper 41 moves backward, the loop of the looper thread is formed, and the needle 11 enters the loop of the looper thread to catch the looper thread. Through these repetitions, seams are formed.

On the lower end portion of each looper 41, the input arm 46 extending leftward is provided. The input arm 46 is integrally connected to the two loopers 41, and the input arm 46 and the loopers 41 integrally perform a swing movement. Accordingly, when the reciprocating movement along the Z-axis direction is input to the input arm 46, each looper 41 performs the reciprocating movement along the X-axis direction.

The lower shaft 42 is rotatably supported in the bed portion 21 along the Y-axis direction.

Further, the lower shaft 42 includes an input shaft 421 and a transmission shaft 422 aligned on the same straight line, and the input shaft 421 and the transmission shaft 422 are integrally rotatably connected by the connecting member 50.

The input shaft 421 is disposed forward in the bed portion 21, and the groove cam 43 is fixedly provided.

Further, the transmission shaft 422 is disposed rearward in the bed portion 21, and the driven pulley 72 of the transmission mechanism 70 is fixedly provided.

The groove cam 43 is disk-shaped and fixedly provided on the input shaft 421 of the lower shaft 42 passing through the center thereof. The input shaft 421 is oriented in the Y-axis direction and is rotatably supported by the two bearings 48 with respect to the base 61.

The groove cam 43 has a cam groove 431 formed on the rear surface side thereof. The cam groove 431 has a substantially circular shape, and has a shape in which the distance from the input shaft 421, which is the rotation center, changes.

The roller 44 is inserted into the cam groove 431 of the groove cam 43.

The roller 44 is held at the swinging end portion of the roller arm 45, and the roller arm 45 is swingably supported about the Y-axis by the base 61. A lower end portion of the looper driving rod 47 is connected to the swing end portion of the roller arm 45, and the upper end portion of the looper driving rod 47 is connected to the input arm 46.

Therefore, when the roller 44 is positioned at a position where the distance from the input shaft 421 in the cam groove 431 of the groove cam 43 is apart, the swing end portion of the roller arm 45 swings upward, and it is possible to rotate the input arm 46 upward via the looper driving rod 47 and to move the tip portion 411 of the looper 41 toward the right.

When the roller 44 is located at a position where the distance from the input shaft 421 in the cam groove 431 of the groove cam 43 is short, the swing end portion of the roller arm 45 swings downward, the arm 46 can be pivoted downward via the looper driving rod 47, and the tip portion 411 of the looper 41 can move leftward.

Thus, the groove cam 43 is configured to convert the operation of the overall rotation of the lower shaft 42 into a reciprocating swing movement to the left and right, and to transfer the operation to each looper 41.

[Connecting Member]

Figure 7:
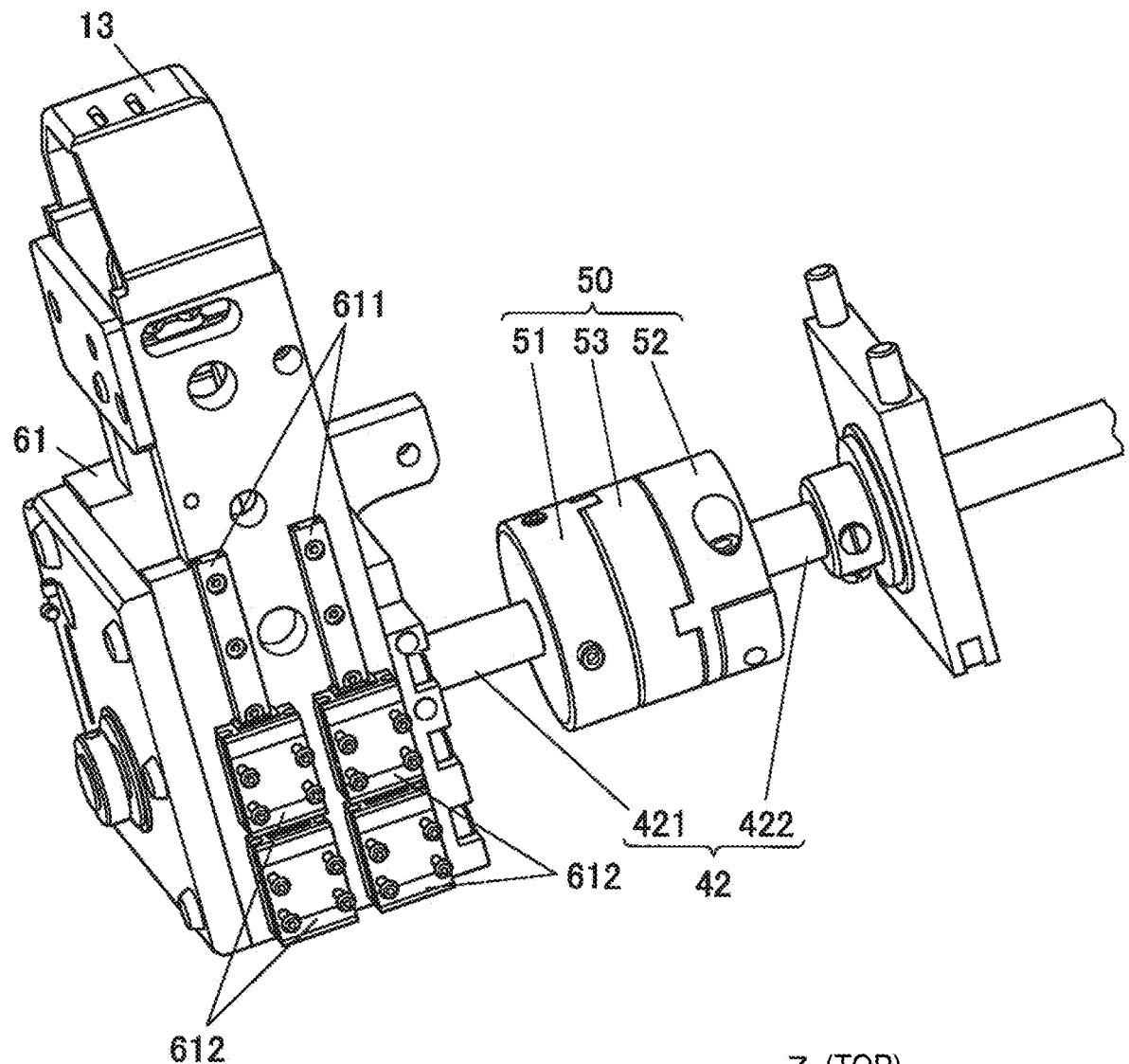
FIG. 7 is a perspective view when a lower shaft is in a torque transmission state.
Figure 7:
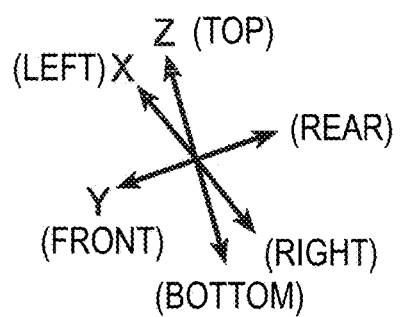
Figure 8:
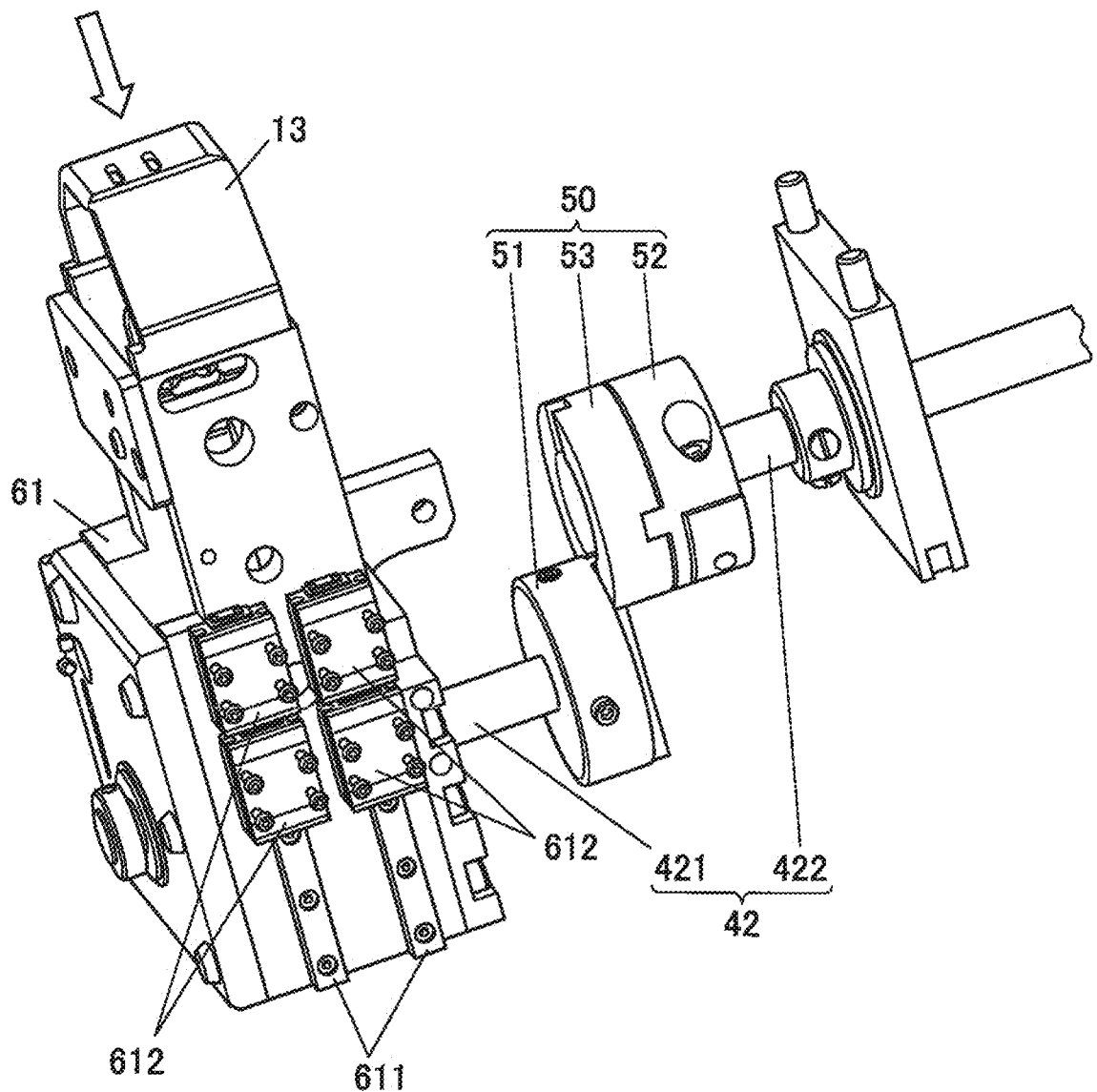
FIG. 8 is a perspective view when the lower shaft is in a separated state.
Figure 8:
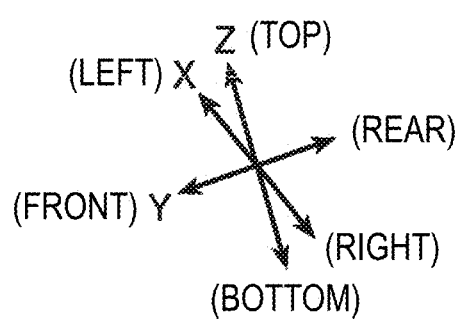
Figure 9:
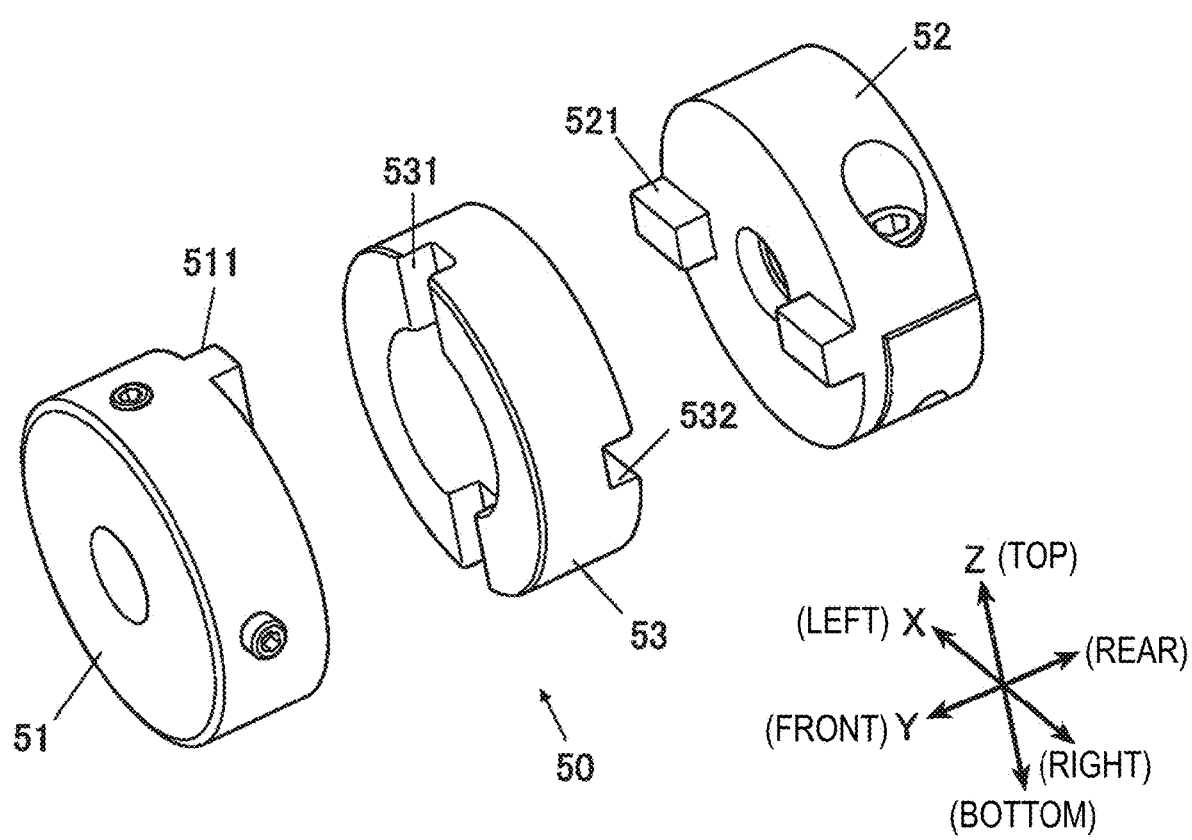
FIG. 9 is an exploded perspective view of a connecting member.

FIGS. 7 and 8 are perspective views of the connecting member 50, and FIG. 9 is an exploded perspective view.

As will be described later, each configuration except the transmission shaft 422 of the lower shaft 42 in the looper mechanism 40 is supported by the base 61, and the base 61 is supported to be movable back and forth with respect to the bed portion 21 along the Z-axis direction.

Therefore, the connecting member 50 is switchable between a state in which the transmission shaft 422 and the input shaft 421 are aligned on the same straight line and torque is transmitted from the transmission shaft 422 to the input shaft 421 (the state in FIG. 7, which is referred to as "torque transmission state") and a state in which only the input shaft 421 descends with respect to the transmission shaft 422 with descending of the base 61 (the state in FIG. 8, which is referred to as "separated state").

That is, the connecting member 50 includes a first joint member 51 provided on the input shaft 421 side, a second joint member 52 provided on the transmission shaft 422 side, and a relay member 53 provided between the first joint member 51 and the second joint member 52.

Both the joint members 51 and 52 and the relay member 53 are disc shaped members having the same outer diameter, and are arranged concentrically and in an integrated cylindrical shape in the torque transmission state.

A through-hole through which the rear end portion of the input shaft 421 is inserted is formed at the center of the first joint member 51, and is fastened and fixed to the input shaft 421 by screw without a head.

On the surface of the first joint member 51 facing the relay member 53, a key 511 in a convex shape extending in a direction orthogonal to the input shaft 421 (the diameter direction of the first joint member 51) is formed.

The second joint member 52 has a through-hole through which the front end portion of the transmission shaft 422 is inserted at the center thereof, and is fastened and fixed to the transmission shaft 422 by a screw without a head.

On the surface of the second joint member 52 facing the relay member 53, a key 521 of a convex shape extending in a direction orthogonal to the transmission shaft 422 (the diameter direction of the second joint member 52) is formed.

A through-hole is formed at the center of the relay member 53, and a first key groove 531, into which the key 511 is slidably fitted, is formed on the surface facing the first joint member 51 along a direction orthogonal to the center axis of the relay member 53 (diametrical direction of the relay member 53).

A second key groove 532 into which the key 521 is slidably fitted is formed on a surface of the relay member 53 facing the second joint member 52 along a direction orthogonal to the central axis of the relay member 53 (in the radial direction of the relay member 53).

The first key groove 531 and the second key groove 532 of the relay member 53 are formed in a non-parallel direction viewed from the central axis direction, that is, in a direction intersecting with each other, more desirably, along mutually orthogonal directions.

In the connecting member 50, an Oldham's coupling is constituted by the first and second joint members 51 and 52 and the relay member 53.

Thus, in a state in which the input shaft 421 and the transmission shaft 422 are aligned on the same straight line, the key 511 of the first joint member 51 and the first key groove 531 of the relay member 53 transmit torque to each other, and the second key groove 532 of the relay member 53 and the key 521 of the second joint member 52 transmit torque to each other. Thus, it is possible to perform the torque transmission from the transmission shaft 422 to the input shaft 421.

Furthermore, when the input shaft 421 moves upward or downward with respect to the transmission shaft 422, the relay member 53 slides along the key 511 of the first joint member 51 and the key 521 of the second joint member 52. Thus, it is possible to permit the upward or downward movement of the input shaft 421 with respect to the transmission shaft 422.

The descending movement of the input shaft 421 with respect to the transmission shaft 422 can be performed in a range that is less than the diameter of the connecting member 50 at most.

Since the first key groove 531 and the second key groove 532 are formed on both sides of the relay member 53 in directions intersecting with (orthogonal to) each other, the movement of the input shaft 421 with respect to the transmission shaft 422 is not limited to the up-down direction, and it is possible to move the input shaft 421 in any combined direction of the first key groove 531 and the second key groove 532 (in any direction along the X-Z plane).

However, since the input shaft 421 moves only in the moving direction of the base 61, movement other than the vertical direction is not planned.

Even when the input shaft 421 and the transmission shaft 422 are not aligned on the same straight line, the Oldham's coupling can transmit torque between the input shaft 421 and the transmission shaft 422, but in the sewing machine 10, the sewing machine motor 31 is driven only when the input shaft 421 and the transmission shaft 422 are aligned on the same straight line.

Although FIG. 7 illustrates a state in which the key 511 of the first joint member 51 and the first key groove 531 of the relay member 53 are disposed along the vertical direction (Z-axis direction), and only the first joint member 51 moves together with the base 61 and the input shaft 421, it is not indispensable to orient the key 511 and the key groove 531 in the vertical direction when the base 61 and the input shaft 421 move.

For example, even when the key 511 and the first key groove 531 are oriented in a direction inclined with respect to the vertical direction, since the relay member 53 slides with respect to the key 511 and the key 521, the input shaft 421 can smoothly move with respect to the transmission shaft 422.

Further, between the first joint member 51 and the relay member 53, a key may be provided on the relay member 53, and a key groove may be provided on the first joint member 51. Similarly, between the second joint member 52 and the relay member 53, a key may be provided on the relay member 53, and a key groove may be provided on the second joint member 52.

[Lifting and Lowering Mechanism]

Figure 10:
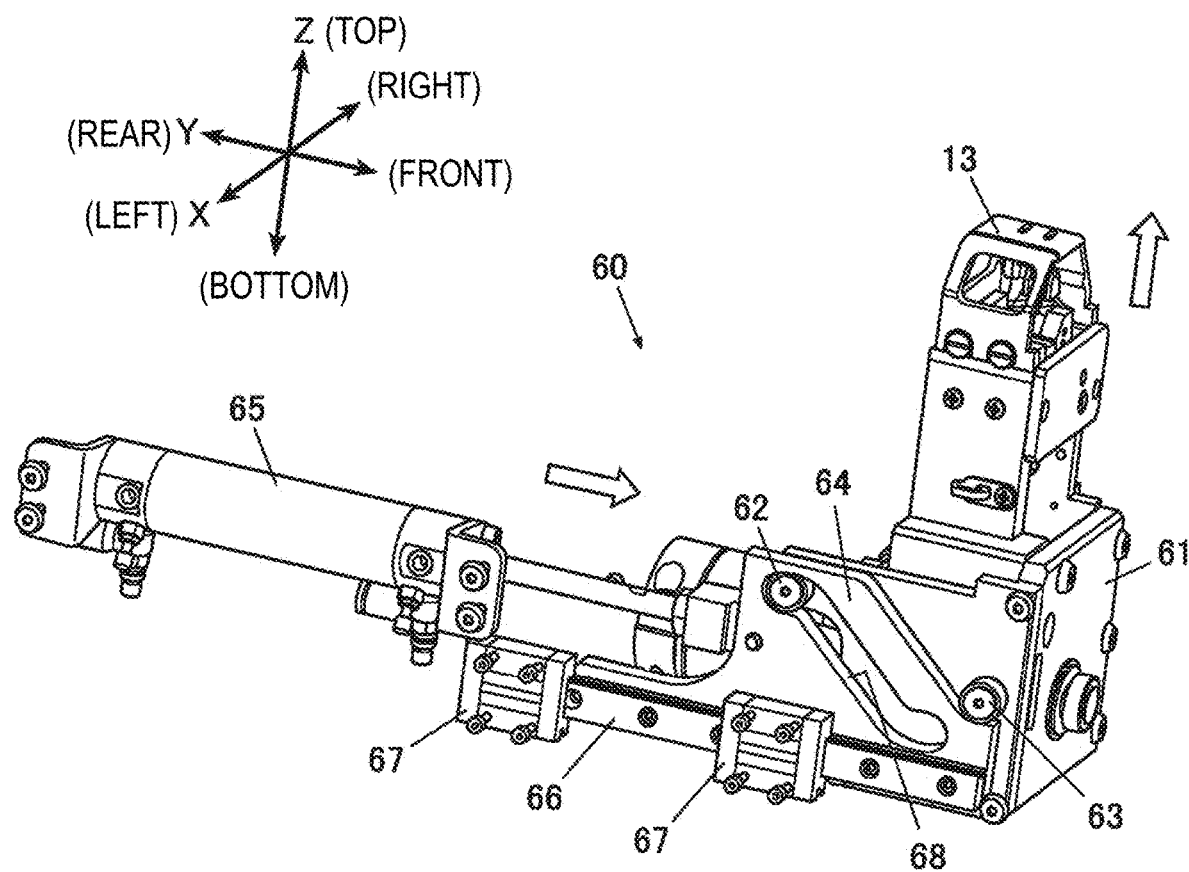
FIG. 10 is a perspective view of a lifting mechanism when a base is located at the upper position.
Figure 11:
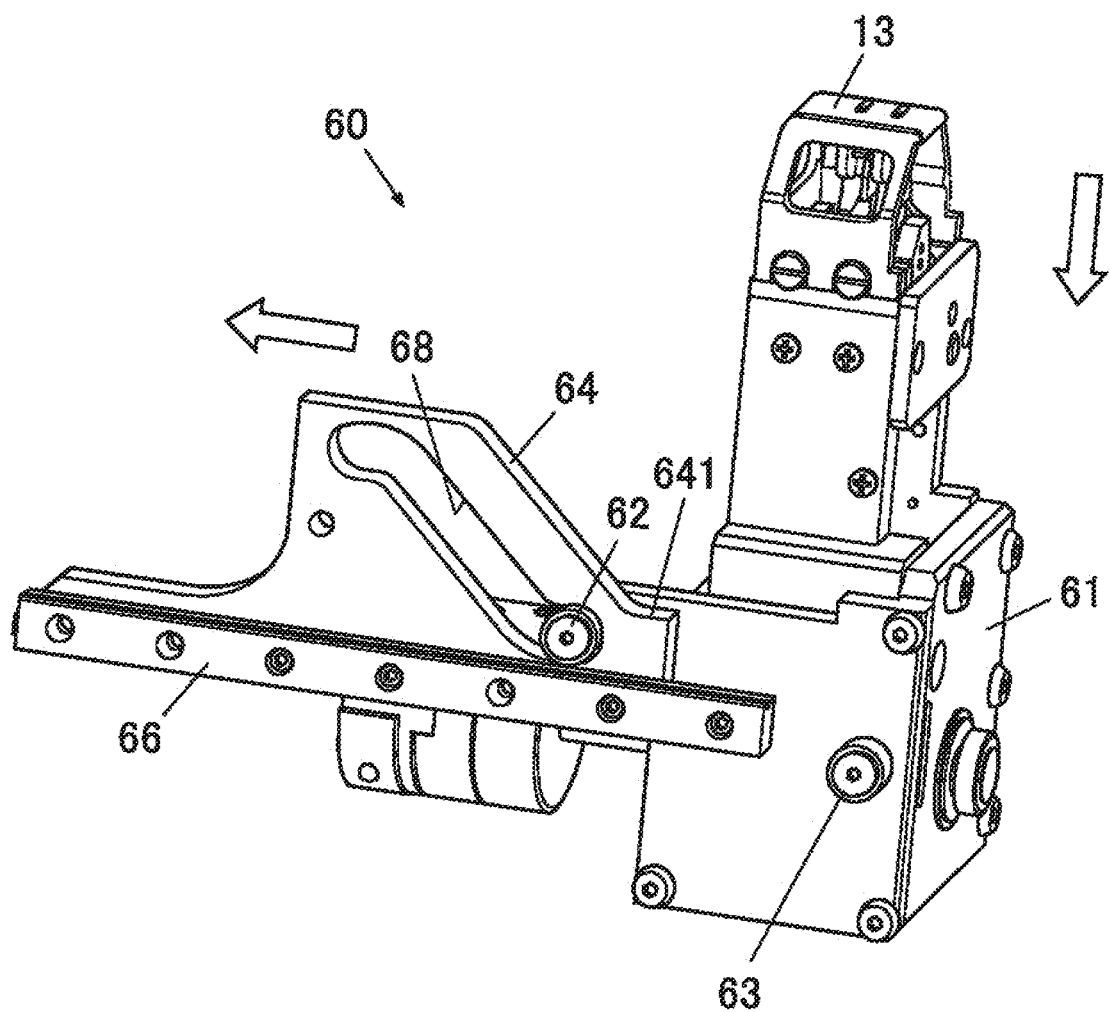
FIG. 11 is a perspective view of the lifting mechanism when the base is located at the lower position.
Figure 11:
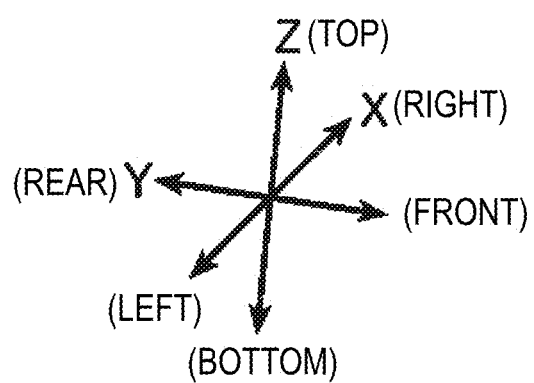

FIG. 10 is a perspective view of a state in which the base 61 of a lifting and lowering mechanism 60 is located at the upper position, and FIG. 11 is a perspective view of a state in which the base 61 of the lifting and lowering mechanism 60 is located at the lower position.

As illustrated in FIGS. 10 and 11, the lifting and lowering mechanism 60 includes a base 61 for supporting the main structure of the needle plate 13 and the looper mechanism 40, first and second cam followers 62 and 63 serving as cam followers provided on the base 61, a cam plate 64 serving as a cam main section which applies a lifting and lowering movement to the base 61 via the first cam follower 62, and a cam driving air cylinder 65 serving as a drive source which allows the cam plate 64 to reciprocate along the Y-axis direction which is a direction intersecting with the moving direction of the base 61.

The base 61 supports a configuration other than the transmission shaft 422 of the looper mechanism 40 inside thereof and holds the needle plate 13 at the upper end portion thereof. The throat plate 13 has an arch shape, and has a flat surface at the top thereof and two stitch point holes 131 are formed on the flat surface (see FIG. 5). The stitch point holes are stitched by the sewing needle 11, and the looper thread is inserted into the loop of the upper thread by the two loopers 41 arranged on the lower side of the flat surface of the upper portion of the throat plate 13.

Two slide rails 611 are fixedly provided on the right outer wall of the base 61 along the Z-axis direction, and two slide blocks 612 relatively slidable along the longitudinal direction of the slide rails 611 are attached respectively on the upper and lower sides in each of the slide rails 611 (see FIGS. 7 and 8). Both of the slide blocks 612 are fixedly provided on the inner wall of the bed portion 21.

Therefore, the base 61 can move up and down with respect to the bed portion 21.

First and second cam followers 62 and 63 are attached to the rear end portion and the front end portion of the left outer wall of the base 61, respectively.

Both of the cam followers 62 and 63 are rollers and are supported by the base 61 so as to be rotatable about the Y-axis.

The cam plate 64 has a flat plate shape along the Y-Z plane, and a slide rail 66 is fixedly provided along the Y-axis direction at the lower edge portion of the cam plate 64, and the two slide blocks 67 relatively slidable in the longitudinal direction of the slide rail 66 are attached to each of the slide rails 66. Both of the slide blocks 67 are fixedly provided on the inner wall of the bed portion 21.

Therefore, the cam plate 64 can reciprocate with respect to the bed portion 21 along the Y-axis direction.

Further, the rear end portion of the cam plate 64 is connected to a plunger of the cam driving air cylinder 65.

The cam driving air cylinder 65 is provided in the bed portion 21 so as to direct the plunger forward and to advance and retreat in the Y-axis direction, thereby making it possible to move the cam plate 64 back and forth in the Y-axis direction.

Figure 12:
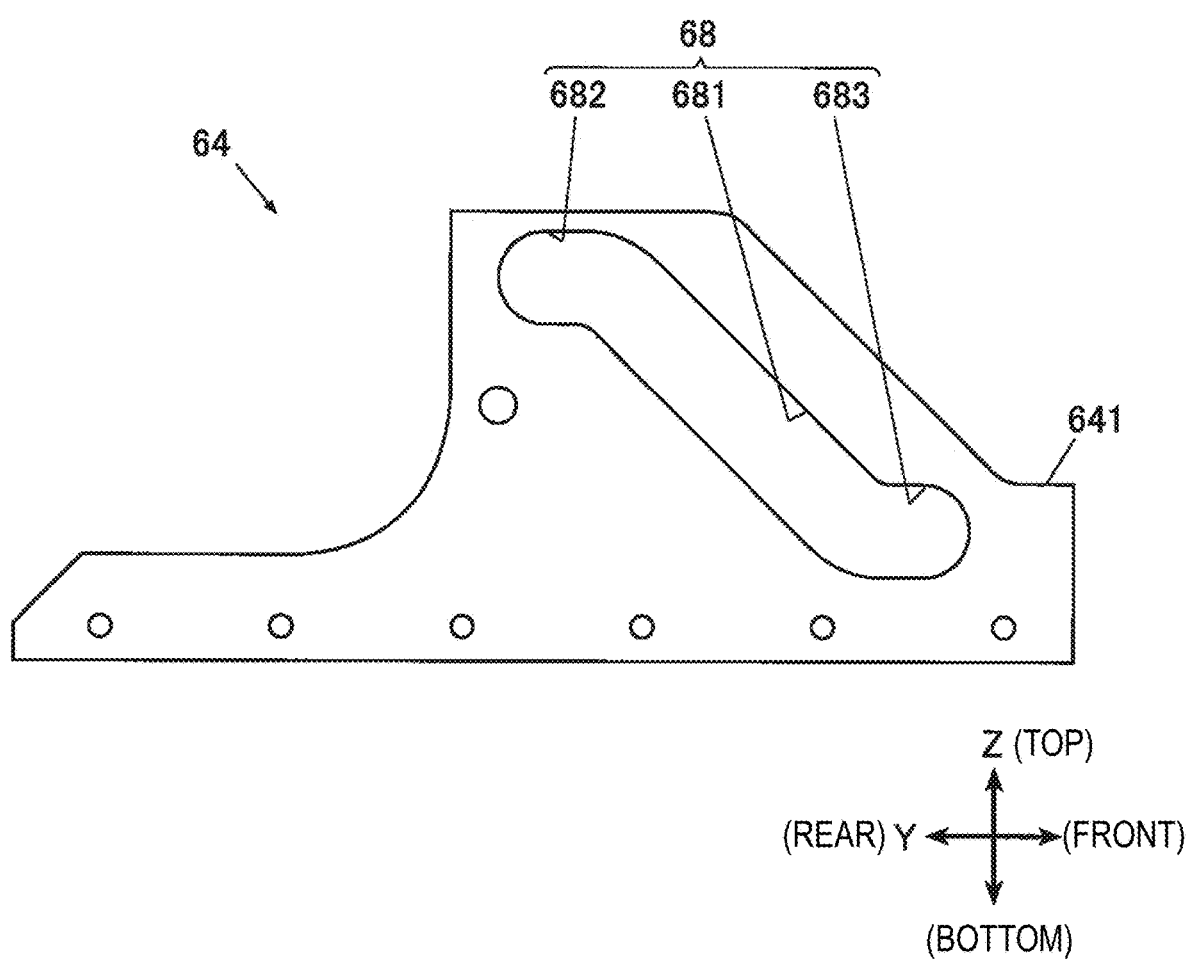
FIG. 12 is a side view of a cam plate.

FIG. 12 is a side view of the cam plate 64.

As illustrated in the drawing, the cam plate 64 is formed with a cam groove 68 as a cam section, and an abutting portion 641.

The cam groove 68 has a first cam follower 62 disposed therein and is formed in a groove shape having a width substantially equal to the diameter of the first cam follower 62. Therefore, the first cam follower 62 can relatively slide in the cam groove 68 along the cam groove 68.

The cam groove 68 has a changing section 681 which is inclined forward obliquely downward, and first and second non-changing sections 682 and 683 which are parallel to the Y-axis direction and are not inclined at both end portions of the changing section 681.

The first non-changing section 682 of the cam groove 68 is located at the uppermost position in the cam groove 68, and as illustrated in FIG. 10, when the first cam follower 62 is positioned in the first non-changing section 682, the base 61 is held at the upper position.

When the base 61 is located at the upper position, the presser foot 14 comes into contact with the needle plate 13 in a state in which the needle plate 13 is pressed, and is in a sewing state in which the workpiece can be sewn.

At the time of sewing, a downward pressing pressure of the presser foot 14 and a downward pressurizing force due to friction between the sewing needle and the workpiece during stitching are applied to the base 61 via the throat plate 13.

However, since the first non-changing section 682 is parallel to the Y-axis direction, the horizontal portion in the cam groove 68 supports the first cam follower 62 from the lower side and also supports the first cam follower 62 from above. Thus, the throat plate 13 can be stably supported and favorable sewing can be performed.

Further, the abutting portion 641 is formed at a position where the second cam follower 63 is placed on the first cam follower 62 when the first cam follower 62 is positioned in the first non-changing section 682. The abutting portion 641 is not in a groove shape but has a configuration coming into contact with the lower portion of the second cam follower 63 only from below. However, like the first non-changing section 682, the abutting portion 641 is parallel to the Y-axis direction. Thus, the abutting portion 641 supports the first cam follower 62 from the lower side at the time of sewing as in the first non-changing section 682, the throat plate 13 can be stably supported, and good sewing can be performed.

Further, since the base 61 is supported by the front end portion and the rear end portion by the cooperation of the first non-changing section 682 and the abutting portion 641, it is possible to more effectively support the needle plate 13 and to perform better sewing.

As described above, the changing section 681 of the cam groove 68 is inclined forward and obliquely downward. Therefore, when the cam plate 64 is moved backward by the cam driving air cylinder 65, the first cam follower 62 is guided downward inside the cam groove 68, and the base 61 can descend toward the lower position.

When the cam plate 64 moves rearward, the second cam follower 63 positioned above the abutting portion 641 is disengaged from the abutting portion 641, and thereafter does not contribute to the operation of the base 61.

The second non-changing section 683 of the cam groove 68 is positioned at the lowermost position in the cam groove 68. As illustrated in FIG. 11, when the first cam follower 62 is positioned in the second non-changing section 683, the base 61 is in a state of being held in the lower position.

When the base 61 is located at the lower position, the above-mentioned presser foot 14 descends considerably downward from the lower end portion of the needle 11 located at the bottom dead center position, and the space between the sewing needle 11 and the throat plate 13 can be widened. Therefore, even when the workpiece has a three-dimensional curved surface shape and has a shape different in the vertical direction, the workpiece can be easily set between the needle 11 and the needle plate 13.

Since the second non-changing section 683 is also parallel to the Y-axis direction, the horizontal portion in the cam groove 68 supports the first cam follower 62 from above and below, and can stably support the throat plate 13.

Stitching Operation of Sewing System

In the sewing system 100 configured as described above, the locus of the stitch point position is set and input in advance by an operation input device (not illustrated). Such a setting operation may be performed by inputting the coordinates of the stitch point position or the posture of the sewing machine 10 as numerical values or by calculating the coordinates of the stitch point position or the posture of the sewing machine 10 from the design data of the workpiece. Further, basic information may be input by so-called teaching in which the robot arm 110 is operated in front of the actual workpiece, and the stitch point position and the posture of the sewing machine are set from the actual posture of the robot arm 110.

When performing teaching or setting a workpiece before sewing, as illustrated in FIG. 11, the cam driving air cylinder 65 of the lifting and lowering mechanism 60 of the sewing machine 10 is operated to move the cam plate 64 in the backward direction.

As a result, in the cam groove 68, the first cam follower 62 moves to the second non-changing section 683, and the base 61 descends to the lower position.

At this time, as illustrated in FIG. 8, on the lower shaft 42 of the looper mechanism 40, the input shaft 421 descends with respect to the transmission shaft 422 to be in a separated state, the first joint member 51 descends with respect to the second joint member 52 of the connecting member 50, and the relay member 53 slides along the respective keys 511 and 521.

As a result, the throat plate 13 is greatly separated from the sewing needle 11 and the presser foot 14 so that space therebetween can be widened.

Therefore, the workpiece can be easily arranged and set between the throat plate 13 and the sewing needle 11.

After completion of the teaching or after completion of the setting of the workpiece, as illustrated in FIG. 10, the cam driving air cylinder 65 in the lifting and lowering mechanism 60 of the sewing machine 10 is operated to move the cam plate 64 in the forward direction.

As a result, in the cam groove 68, the first cam follower 62 moves to the first non-changing section 682, and the base 61 rises to the upper position. In addition, the second cam follower 63 is disposed so as to abut on the upper surface of the abutting portion 641.

At this time, as illustrated in FIG. 7, in the lower shaft 42 of the looper mechanism 40, the input shaft 421 rises to an aligned position on the same straight line as the transmission shaft 422 to be in a torque transmission state, and the first joint member 51, the relay member 53, and the second joint member 52 of the connecting member 50 are arranged concentrically.

As a result, the throat plate 13 comes close to the sewing needle 11, the presser foot 14 reaches a height where the presser foot 14 abuts on the throat plate 13, and when the workpiece is set, the workpiece is held in the presser foot 14.

At the time of sewing, the robot arm 110 moves the sewing machine 10 along the locus of the set stitch point position and tilts the sewing machine 10 in the set direction.

Further, the control device for controlling the robot arm 110 simultaneously controls the speed of the sewing machine motor 31 of the sewing machine 10 (additional axis control).

The target position and the posture are determined with respect to the robot arm 110 at a predetermined time period (for example, several [ms]) to perform movement control, and the rotation position of the sewing machine motor 31 and the robot arm position are synchronously controlled each time. As a result, it is possible to form seams with a uniform stitch pitch on the workpiece having a three-dimensional curved surface shape.

After completion of sewing, the base 61 is lowered again to release the workpiece.

Effect of Embodiment

The sewing machine 10 of the sewing system 100 is movably supported along a direction in which the base 61 approaches or separates from the sewing needle 11 with respect to the bed portion 21, and a connecting member 50, which changes in a state in which the input shaft 421 and the transmission shaft 422 are aligned on the same line so as to be capable of transmitting torque and a state in which the input shaft 421 moves with respect to the transmission shaft 422, is provided between the input shaft 421 and the transmission shaft 422.

Therefore, it is possible to easily lower the needle plate 13 from the sewing needle 11 by lowering the base 61, and it is possible to easily set the workpiece having a three-dimensional shape.

Further, since the connecting member 50 is provided, the entire driving portion of the looper mechanism 40 including the looper 41 can be lowered together with the base 61, and thus, the needle plate 13 can be lowered without interfering with the surrounding configuration.

Further, since the connecting member 50 is constituted by the Oldham's coupling, even if the input shaft 421 is moved upward and downward with respect to the transmission shaft 422, the first and second coupling members 51 and 52 and the relay member 53 constituting the Oldham's coupling can be maintained in the connected state rather than the separated state. Thus, in switching between the torque transmission state and separated state between the input shaft 421 and the transmission shaft 422, the artificial operation is not required, and switching between the two states can be smoothly performed.

Further, the sewing machine 10 has the lifting and lowering mechanism 60 which includes cam followers 62 and 63 as cam followers, a cam plate 64 as a cam main section with a cam groove 68 as a cam section formed thereon, and a cam driving air cylinder 65 as a drive source for reciprocally moving the cam plate 64 in a direction (Y-axis direction) intersecting with the moving direction of the base 61. Thus, it is possible to stably and quickly perform the lifting and lowering movement of the base 61.

Further, in the lifting and lowering mechanism 60, the cam groove 68 of the cam plate 64 has a changing section 681 formed in a shape causing the displacement in the moving direction of the base 61 with the reciprocating movement of the cam plate 64 by the cam driving air cylinder 65, and has, at one end portion of the changing section 681, the first non-changing section 682 and the abutting section 641 which do not cause displacement in the direction (descending direction) in which the base 61 separates from the position where the base 61 has most moved to the sewing needle 11 side.

Therefore, even when the throat plate 13 is set at the upper position and pressed downward by the descent of the presser foot 14 or the sewing needle 11 in the sewing state, the cam followers 62 and 63 are supported from below by the first non-changing section 682 of the cam groove 68 or the abutting portion 641 so that the base 61 and the throat plate 13 can be stably held against the downward pressing. Therefore, good sewing can be realized and sewing quality can be improved.

Further, since the sewing machine 10 is capable of opening the space between the sewing needle 11 and the needle plate 13 by lifting and lowering the base 61, there is no need to provide a movable structure on the side of the sewing machine arm portion 23, and the robot arm 110 is capable of indicating the needle bar side end portion of the arm portion 23.

Therefore, it is possible to arrange the stitch point position of the sewing machine 10 at a position close to the tip portion of the robot arm 110, and it is possible to improve the positioning accuracy of the stitch point position and to improve the sewing quality.

[Another Example of Connecting Member]

Further, the connecting member 50 is not limited to the Oldham's coupling, but may be applied to another structure in which the members can be returned to a state of being aligned on the same straight line immediately without being completely separated from each other, while allowing the parallel movement of the input shaft 421.

For example, on the side of the input shaft 421, the same one as the above-mentioned first joint member 51 is fixedly provided, and on the transmission shaft 422 side, the second joint member having a key groove to which key 511 slidably fitted and which is formed on the surface facing the first joint member 51 along the direction orthogonal to the central axis thereof may be fixedly provided, and the connecting member may be constituted by the two members.

As a result, while allowing the parallel movement of the input shaft 421, the members can be returned to a state in which the members are immediately aligned on the same straight line without being completely separated from each other, and it is possible to allow the lifting and lowering movement of the base 61.

However, since the input shaft 421 can only move in the direction along the key 511 with respect to the transmission shaft 422, there is a need to control the sewing machine motor 31 so that the key 511 is oriented along the Z-axis direction and then lift and lower the base 61 by the detecting means for detecting the shaft angle provided on the output shaft of the lower shaft 42, the upper shaft 32 or the sewing machine motor 31.

Figure 13:
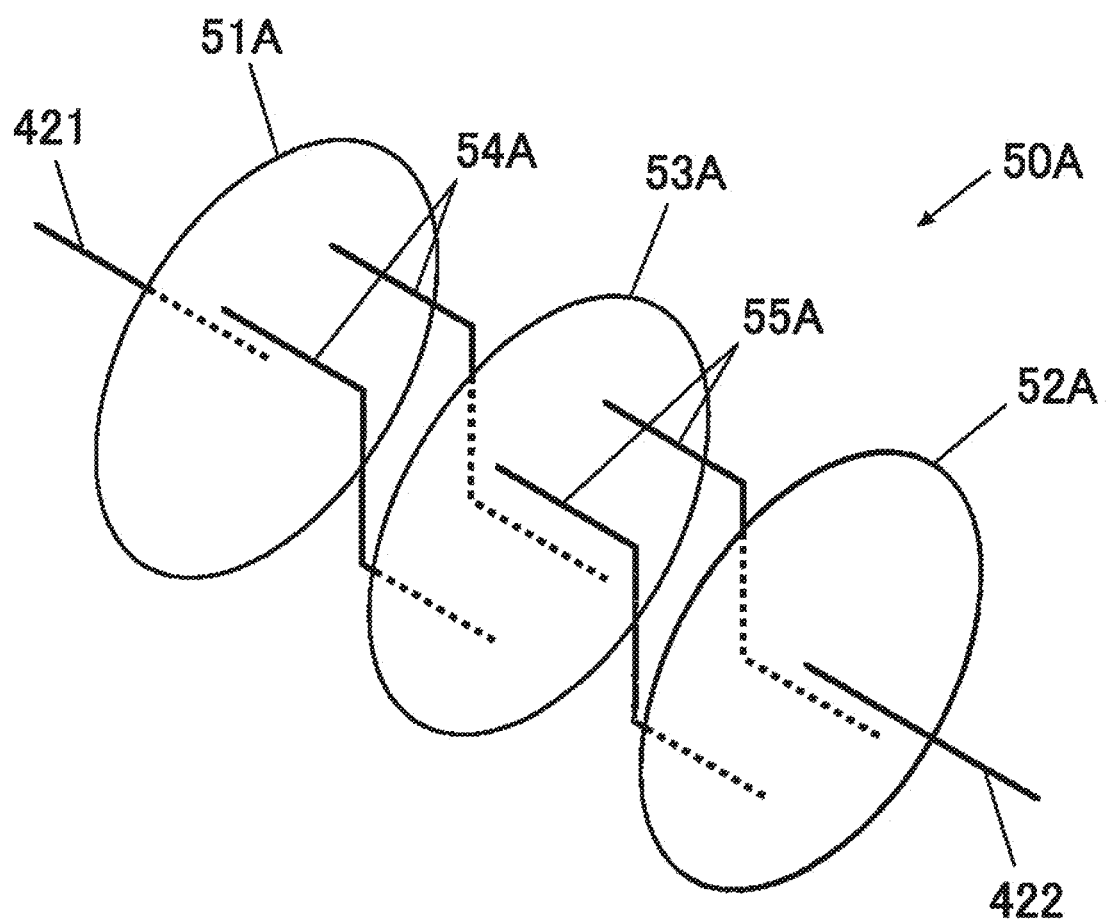
FIG. 13 is a schematic configuration diagram of a connecting member including a Schmidt coupling.

In addition, a Schmidt coupling that functions similarly to the Oldham's coupling may be used for the connecting member 50. As illustrated in FIG. 13, a Schmidt coupling 50A includes a disc-shaped first joint member 51A fixedly provided on the input shaft 421 at the center thereof, a second joint member 52A fixedly provided on the transmission shaft 422 at the center thereof, a relay member 53A disposed between the members, two or more link members 54A having equal length connecting the first joint member 51A and the relay member 53A to each other, and two or more link members 55A having equal length connecting the second joint member 52A and the relay member 53A. One end portion and the other end portion of each link member 54A, 55A is connected to the first or second joint member 51A, 52A or the relay member 53A so as to be rotatable about the axis of the same direction as the input shaft 421, the plurality of link members 54A are disposed in parallel to each other, and the plurality of link members 55A are also disposed in parallel to each other.

The Schmidt coupling 50A having such a configuration also allows parallel movement of the input shaft 421, and the members can be returned to a state in which the members are immediately aligned on the same straight line without being completely separated from each other.

[Others]

Figure 14:
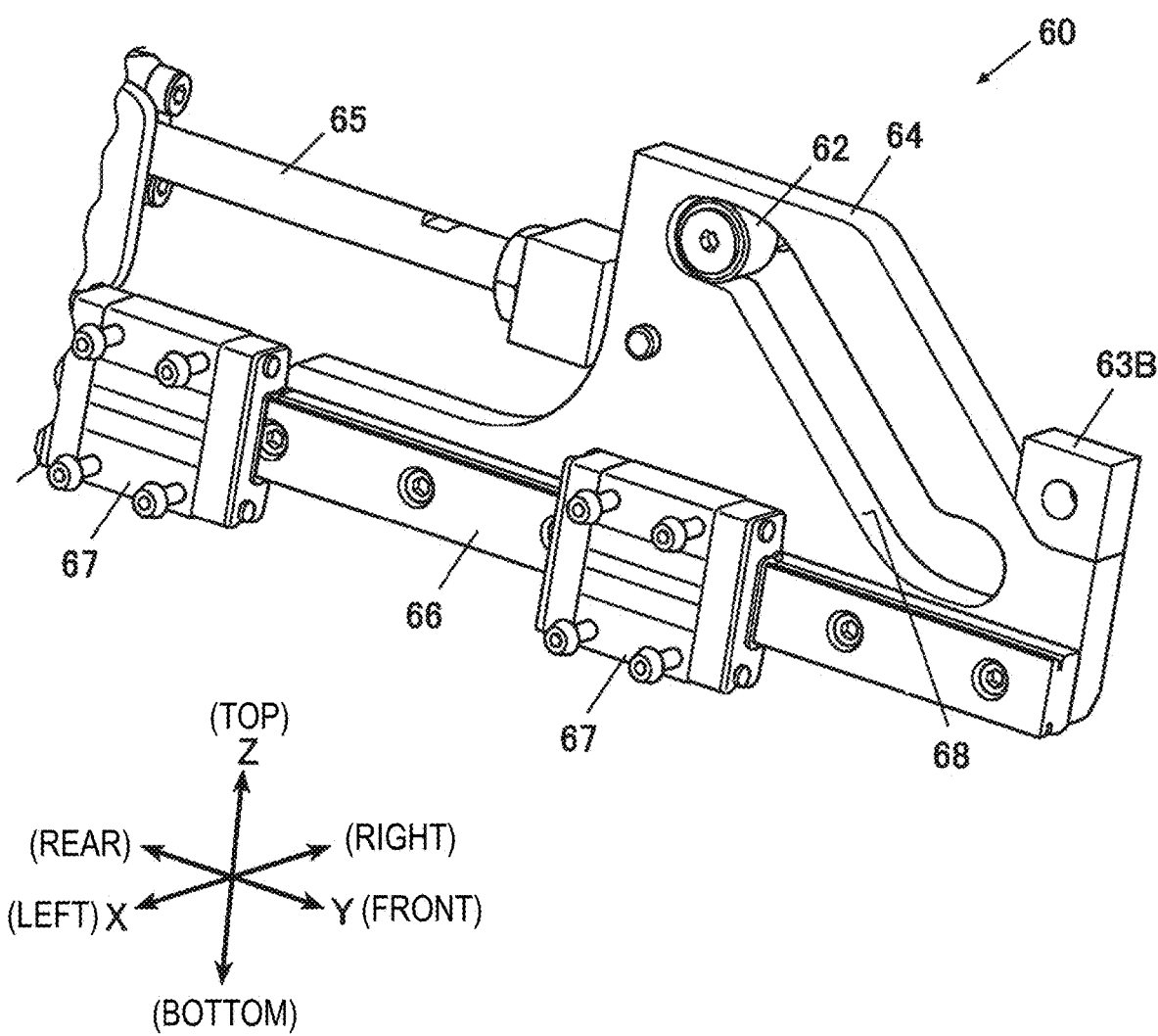
FIG. 14 is a perspective view illustrating another example of a cam follower.

Further, since the second cam follower 63 of the lifting and lowering mechanism 60 is not configured to fit into the groove cam, the second cam follower is not indispensable that the second cam follower 63 is a roller like the first cam follower 62. For example, like a second cam follower 63B illustrated in FIG. 14, it may be constituted by a member such as a square frame having a sliding contact surface in sliding contact with the abutting portion 641. In this case, the corner of the second cam follower 63B may be chamfered or rounded so as not to interfere with the corner portion of the cam plate 64.

Further, the lifting and lowering mechanism 60 is configured to make the cam plate 64 reciprocate in the Y-axis direction so that the first and second cam followers 62 and 63 reciprocate in the Z-axis direction. However, there may be a configuration in which the cam plate 64 is fixedly provided on the base 61 and the first and second cam followers 62 and, 63 are provided on a plunger of the cam driving air cylinder 65, the first and second cam followers 62 and 63 reciprocate in the Y-axis direction, and the plate 64 may reciprocate in the Z-axis direction.

In the above-described sewing system 100, the sewing machine 10 having the looper mechanism 40 is exemplified, but it is also possible to apply the lifting and lowering mechanism 60 and the connecting member 50 to a sewing machine having a shuttle mechanism.

In this case, the shuttle mechanism may be a full rotary shuttle, a half rotary shuttle, a horizontal rotary shuttle or a vertical rotary shuttle, but it is necessary to provide a transmission mechanism 70 for rotating the lower shaft 42 with respect to the upper shaft 32 at twice speed.

In addition, since the whole rotary shuttle does not reciprocatly swing, there is no need to convert the full rotation to the reciprocating rotation, and the transmission mechanism in the base 61 can be simplified.

In the case of a horizontal shuttle, it is necessary to provide a transmission mechanism for transmitting torque from the input shaft 421 to the shuttle 9 shaft rotating around the Z-axis in the base 61.

The invention claimed is:

1. A sewing machine in which a base configured to support a throat plate, a shuttle or a looper, and an input shaft for a stitching operation to the shuttle or the looper, with respect to a bed portion of a frame is supported to be movable along a direction of approaching or separating from a sewing needle, the sewing machine comprising:
   a connecting member configured to change between a first state in which the input shaft and a transmission shaft are aligned in the same straight line to transmit torque and a second state in which the input shaft moves together with the base out of alignment with the transmission shaft, between the input shaft on the base side and the transmission shaft which transmits power to the input shaft,
   wherein the connecting member includes a first joint member provided on the input shaft side and a second joint member provided on the transmission shaft side,
   the connecting member is connected by a key formed on any one of surfaces of the first joint member and the second joint member facing each other, and a key groove formed on the other surface, and
   the key and the key groove are formed along a direction orthogonal to the input shaft and the transmission shaft.

2. The sewing machine according to claim 1, wherein the connecting member is an Oldham's coupling or a Schmidt coupling,
   wherein the Oldham's coupling comprises the first joint member, a relay member, and the second joint member, and
   wherein the Schmidt coupling comprises the first joint member, a relay member, the second joint member, and two or more link members.

3. The sewing machine according to claim 1, further comprising:
   a lifting and lowering mechanism which moves the base along a direction of approaching and separating from the sewing needle,
   the lifting and lowering mechanism includes:
   a cam follower,
   a cam main section formed with a cam section which relatively moves the cam follower in a moving direction of the base, and
   a driving source which causes the cam main section or the cam follower to reciprocate in a predetermined direction intersecting with the moving direction of the base.

4. The sewing machine according to claim 3, wherein the cam section of the cam main section has a changing section which causes displacement in the moving direction of the base along with the reciprocating movement of the cam main section or the cam follower by the driving source, and
- a non-changing section is provided at one end of the changing section so as not to cause displacement in a direction in which the base is spaced apart from a position where the base has most moved to the sewing needle side.

5. A sewing system comprising:
the sewing machine according to claim 1; and
a robot arm which holds the sewing machine at a tip portion of the arm.

6. The sewing system according to claim 5, wherein a needle bar side end portion of an arm portion of the sewing machine is supported by the robot arm.

* * * * *